J. C. BARBER.
ROLLER BEARING.
APPLICATION FILED JAN. 3, 1910.

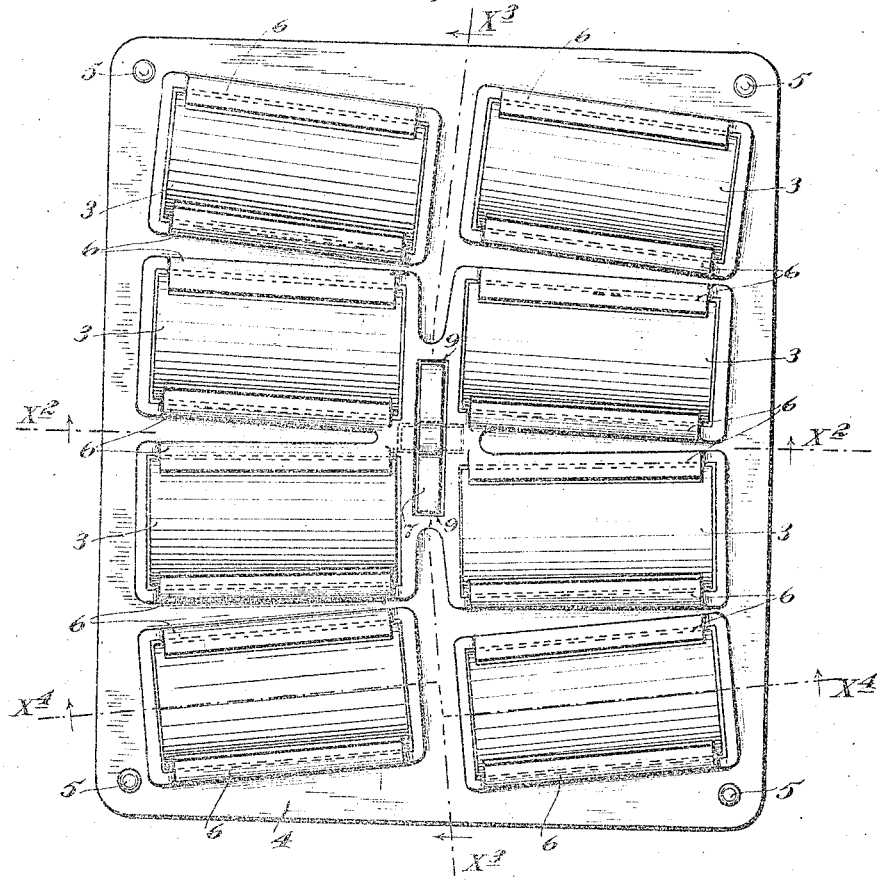

987,422.

Patented Mar. 21, 1911.
2 SHEETS—SHEET 2.

Witnesses
H. O. Kilgore
W. H. Souba

Inventor:
John C. Barber
By his Attorneys
Williamson & Merchant

UNITED STATES PATENT OFFICE.

JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

ROLLER-BEARING.

987,422.

Specification of Letters Patent. Patented Mar. 21, 1911.

Application filed January 3, 1910. Serial No. 536,085.

*To all whom it may concern:*

Be it known that I, JOHN C. BARBER, a citizen of the United States, residing at Chicago, in the county of Cook and State of Illinois, have invented certain new and useful Improvements in Roller-Bearings; and I do hereby declare the following to be a full, clear, and exact description of the invention, such as will enable others skilled in the art to which it appertains to make and use the same.

My invention has for its object to provide an improved roller bearing, and particularly has for its object to provide an improved roller side bearing for car trucks of the type disclosed and claimed in my pending application, S. N. 532,531, filed of date December 11th, 1909.

To the above ends, the invention consists of the novel devices and combinations of devices hereinafter described and defined in the claim.

In the accompanying drawings, which illustrate the invention, like characters indicate like parts throughout the several views.

Figure 3:
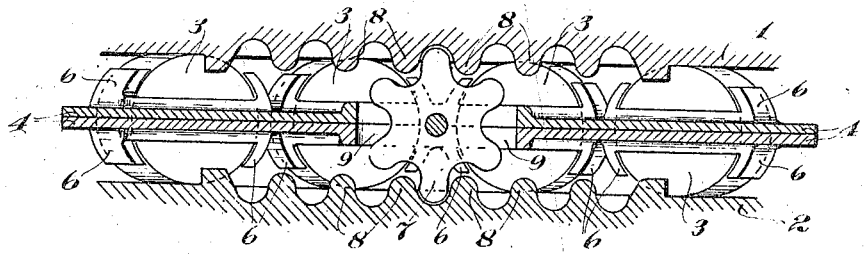
Figure 4:
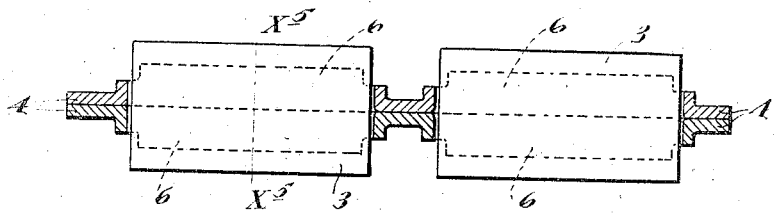
Figure 5:
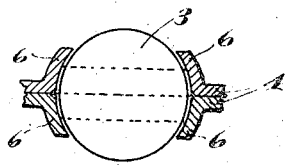

Referring to the drawings, Figure 1 is a plan view of the improved roller bearing with the upper roller-engaging plate or member removed from working position; Fig. 2 is a vertical section taken through the center bearing on the line $x^2 x^2$ of Fig. 1; Fig. 3 is a longitudinal section taken through the center bearing on the line $x^3 x^3$ of Fig. 1; Fig. 4 is a transverse vertical section taken through a portion of the center bearing on the line $x^4 x^4$ of Fig. 1, the roller being left in full; and Fig. 5 is a fragmentary view in section on the line $x^5 x^5$ of Fig. 4, the roller therein shown being in full.

The numerals 1 and 2 indicate respectively the upper and lower bearing plates between which bearing rollers 3 are interposed. In the particular application of this roller bearing, shown in my said prior application, the lower bearing plate 2 is an intermediate or floating bearing plate, and the upper bearing plate 1 is connected to and movable with the truck bolster, which, in turn, is pivotally connected to the car or body bolster with freedom for both oscillatory or radial movements and for endwise movements transversely of the truck. So far as the present invention is concerned, however, these upper and lower bearing plates may take various forms, but in the application of this center bearing to car trucks, the rollers 3 should be radially disposed in respect to the intermediate pivotal connection between the truck and car bolsters.

To secure the best results under all circumstances, and especially in car construction where the rollers are radially disposed, the said rollers are arranged in two concentric series. These two sets of rollers are held properly spaced and properly positioned between the upper and lower bearing plates by a so-called roller spacing cage, made up of two flat plates 4 placed face to face and, as shown, secured at their four corners by rivets 5. Both the upper and lower plates 4 have openings, in which the rollers are seated, and at the longitudinal edges of these openings, the said plates are provided with upwardly and downwardly extended segmental roller-retaining flanges 6. The roller-retaining flanges 6 terminate at their edges at such points that they do not engage either with the upper or lower bearing plates but, nevertheless, loosely hold the rollers interlocked to the cage plates properly spaced apart and free for rotation and under frictional engagement of the upper and lower bearing plates therewith and of the movement of one of said bearing plates in respect to the other.

To maintain the rollers always in proper relative positions in respect to the bearing plates, a toothed wheel or pinion 7 is journaled to the roller cage and has engagement with the upper and lower segmental rows of gear teeth 8 formed on the upper and lower surfaces of the bearing plates 1 and 2. To secure the best results, this pinion 7 is located at the center of the roller cage between the two concentric series of rollers, and it is provided with projecting trunnions that are loosely journaled in seats formed in part in each of the two plates 4, the said two plates being cut away at 9 to clear the said pinion.

As is evident, when the two bearing plates 1 and 2 are oscillated in respect to each other, the pinion 7 will prevent slipping of the rollers in respect to the said bearing plates and will thus prevent the rollers from working in one direction or the other beyond their proper predetermined working positions in respect to the said bearing plates. The cage and the coöperating pinions and teeth on the bearing plates act as a safety device to insure the proper travel of the rollers.

What I claim is:

A roller spacing cage made up of a pair of metal plates rigidly secured, face to face, and provided with reversely projecting segmental roller retaining flanges arranged in two rows and having half seats at their central portions between the said two rows of the retaining flanges, rollers arranged in two rows and held for rotation by the said retaining flanges, and a pinion having projecting trunnions mounted in the said coöperating half seats of said plates, the said pinion projecting through the said plates and working between the said two rows of rollers, substantially as described.

In testimony whereof I affix my signature in presence of two witnesses.

JOHN C. BARBER.

Witnesses:
   JAS. F. WILLIAMSON,
   F. D. MERCHANT.